3,042,664
ALKENYL ARYL MONOMERS, POLYMERS THEREOF AND POLYMERIZATION PROCESSES
John A. Price, Swarthmore, Pa., assignor to American Viscose Corporation, Philadelphia, Pa., a corporation of Delaware
No Drawing. Filed Mar. 27, 1959, Ser. No. 802,288
13 Claims. (Cl. 260—91.5)

This invention relates to certain alkenyl aryl and alkenyl haloaryl monomers and to polymers thereof. More particularly this invention relates to certain pentenyl aryl and pentenyl haloaryl monomers and to polymers thereof.

It is an object of this invention to provide certain novel pentenyl aryl and pentenyl haloaryl compounds.

Another object of this invention is to provide methods of polymerizing certain pentenyl aryl and pentyl haloaryl compounds.

A further object of this invention is to provide normally solid higher molecular weight polymers of pentenyl aryl and pentenyl haloaryl compounds.

The monomers of this invention may be represented by the general formula:

$$\begin{array}{c} \text{H H H H H} \\ \text{C=C—C—C—CH} \\ \text{H} \quad \text{H} \quad | \quad \text{H} \end{array}$$

[benzene ring with substituents $z$ and $x$ on the ring and $y$ at the para position]

wherein $x$, $y$ and $z$ are each either hydrogen, chlorine or methyl but when $y$ is chlorine or methyl $z$ is hydrogen.

The monomers of this invention are certain 4-phenyl pentenes, 4-tolyl pentenes, 4-xylyl pentenes, the 4-(chloro and dichloro phenyl)pentenes, 4-(chlorotolyl)pentenes, and include both the dextro and levo forms and mixtures thereof. More specifically, the monomers include:

4-phenyl-1-pentene
    4-(m tolyl)-1-pentene
    4-(p tolyl)-1-pentene
    4-(3', o xylyl)-1-pentene
    4-(3' m xylyl)-1-pentene
    4-(3' methyl, 4' chlorophenyl)-1-pentene
    4-(3' chloro, 4' methylphenyl)-1-pentene
    4-(3' chloro, 5' methylphenyl)-1-pentene
    4-(3',4' dichlorophenyl)-1-pentene
    4-(3',5' dichlorophenyl)-1-pentene
    4-(m chlorophenyl)-1-pentene
    4-(p chlorophenyl)-1-pentene The monomers may be prepared by reacting 3-chloro-1-propene with magnesium in dry ether to form the corresponding Grignard reagent and then reacting the Grignard reagent with the 1-bromoethyl aryl compound to form the 4-pentenyl aryl compound.

The following example is illustrative of a method of forming 4-phenyl-1-pentene. The other monomers may be made in a similar manner.

*Example 1*

A two-liter, 3-neck flask was equipped with a stirrer, thermometer, reflux condenser, and addition funnel. The flask was charged with 48.6 g. of magnesium turnings and then the flask and assembly were flamed with a Bunsen burner for 10 minutes while purging with nitrogen. Two hundred fifty milliliters of dry ether was added to the cooled flask and then 138 g. of 3-chloropropene diluted with dry ether to 500 ml. was slowly added with stirring over a period of two hours. The temperature was maintained at 12–20° C. during this period and for an additional 2.5 hours. To this slurry was then slowly added 278 grams of 1-bromoethylbenzene, diluted with dry ether to 500 ml., over a period of one hour at a temperature of 38–41° C. The reaction mixture was then stirred and refluxed for an additional 100 minutes.

The cooled slurry was poured into a liter of ice and water containing 110 grams of ammonium chloride. The ether layer was separated and the aqueous layer was extracted with two 200 ml. portions of ether. The combined ether extracts were dried over sodium sulfate. After the ether was stripped off, the residue was vacuum distilled. A fraction boiling at 103–5° C. at 10 mm. pressure and weighing 107 grams was collected as the monomer 4-phenyl-1-pentene.

The monomers of this invention may be polymerized by the use of a catalyst system comprising a halide of a metal of group IVa of the periodic table and an aluminum lower alkyl to form normally solid high molecular weight polymers. The polymers may be used to form fibers, films, coatings, and molded products.

In the catalyst the group IVa metals include, for example, titanium and zirconium and either the trichloride or tetrachloride of the metal may be used. The aluminum lower alkyl portion of the catalyst includes, for example, aluminum triethyl, aluminum tributyl, aluminum triisobutyl and ethyl aluminum sesqui chloride. The latter is a mixture of ethyl aluminum dichloride and diethyl aluminum chloride.

The molar ratio of the aluminum to the group IVa metal in the catalyst system is the ratio of from 0.5 to 3.5 mol aluminum to 1 mol of the group IVa metal.

In carrying out the polymerization process a slurry is formed of the catalyst by adding each metal compound of the catalyst system to an inert solvent such as hexane. The metal compounds react in the solvent to form a slurry of the catalyst system in the solvent. A small amount of the catalyst is used. For practical purposes the amount may be from 2 to 5%, based on the weight of the monomer to be polymerized. The monomer is slowly added to the catalyst slurry with stirring. The temperature is raised to reflux and the reaction is continued. A normally solid high molecular weight polymer is obtained.

Homo polymers of the monomers may be made or two or more of the monomers may be copolymerized together. Also, one or more of the monomers may be polymerized with other alkenyl aryl compounds such as styrene.

The following examples are illustrative of the invention:

*Example 2*

A dry reaction vessel was purged with nitrogen and charged with 100 ml. of toluene, 4.3 grams of titanium trichloride, and 7.6 ml. of aluminum triisobutyl. The slurry was heated to 90° C. and 50 grams of 4-phenyl-1-pentene was added with stirring over a 10 minute period. The slurry was heated to reflux (118°–121° C.), where it was maintained for 19 hours. It was then cooled and treated with 300 ml. of methanol. The solid polymer was collected on a funnel, then washed by reslurrying three times with 50 ml. portions of a solution containing 100 ml. of isopropanol and 50 ml. of 18% hydrochloric acid. The polymer was finally washed with 3–50 ml. portions of methanol. The yield of dry white powdery poly 4-phenyl-1-pentene amounted to 6.0 grams. The polymer had a melting range of 237–42° C.

*Example 3*

A reaction vessel was purged with nitrogen and charged with 100 ml. of dry heptane, 1.5 ml. of titanium tetrachloride and 3.3 ml. of aluminum triisobutyl. Twenty-five grams of 4-phenyl-1-pentene was added with stirring over a 5 minute period at a temperature of 40-43° C. The slurry was heated to reflux temperature (99-103° C.) where it was maintained for 21 hours. It was then cooled and treated with 100 ml. of isopropanol followed by 100 ml. of methanol. The solid polymer was collected on a funnel, then washed by reslurrying with 3-100 ml. portions of a solution containing 100 ml. of 18% hydrochloric acid and 200 ml. of isopropanol. The polymer was finally washed with 3-50 ml. portions of methanol. The dried white powdery poly 4-phenyl-1-pentene weighed 0.8 gram.

*Example 4*

The quantities and conditions employed in Example 2 are repeated except that the 7.6 ml. of aluminum triisobutyl is replaced with 18.8 ml. of a 25% solution of aluminum triethyl in heptane. A moderate yield of white powdery poly 4-phenyl-1-pentene is again obtained.

I claim:
1. A normally solid polymer of at least one compound having the general formula:

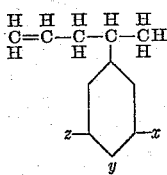

wherein $x$, $y$ and $z$ are each members of the group consisting of hydrogen, chlorine and methyl and $z$ is hydrogen when $y$ is a member of the group consisting of chlorine and methyl.
2. A normally solid polymer of 4-phenyl-1-pentene.
3. A normally solid polymer of 4-(p tolyl)-1-pentene.
4. A normally solid polymer of 4-(p chlorophenyl)-1-pentene.
5. A normally solid polymer of 4-(3', m xylyl)-1-pentene.
6. A normally solid polymer of 4-(m tolyl)-1-pentene.
7. A method of producing a normally solid polymer by refluxing in contact with a group IVa metal halide aluminum lower alkyl catalyst system at least one compound having the general formula:

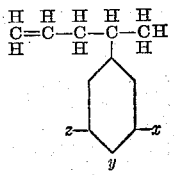

wherein $x$, $y$ and $z$ are each members of the group consisting of hydrogen, chlorine and methyl and $z$ is hydrogen when $y$ is a member of the group consisting of chlorine and methyl.
8. A method of producing a normally solid polymer by refluxing 4-phenyl-1-pentene in contact with a group IVa metal halide aluminum lower alkyl catalyst system.
9. A method of producing a normally solid polymer by refluxing 4-(p tolyl)-1-pentene in contact with a group IVa metal halide aluminum lower alkyl catalyst system.
10. A method of producing a normally solid polymer by refluxing 4-(p chlorophenyl)-1-pentene in contact with a group IVa metal halide aluminum lower alkyl catalyst system.
11. A method of producing a normally solid polymer by refluxing 4-(3', m xylyl)-1-pentene in contact with a group IVa metal halide aluminum lower alkyl catalyst system.
12. A method of producing a normally solid polymer by refluxing 4-(m tolyl)-1-pentene in contact with a group IVa metal halide aluminum lower alkyl catalyst system.
13. A method of producing a normally solid polymer by refluxing 4-phenyl-1-pentene in contact with a titanium trichloride aluminum triisobutyl catalyst system.

References Cited in the file of this patent

UNITED STATES PATENTS

| | | |
|---|---|---|
| 2,842,531 | Baxter | July 8, 1958 |
| 2,894,993 | Schmerling | July 14, 1959 |

OTHER REFERENCES

Ferris, "Handbook of Hydrocarbons," Academic Press Inc., New York, N.Y., page 179 (1955).